United States Patent
Almond et al.

(10) Patent No.: US 7,246,665 B2
(45) Date of Patent: Jul. 24, 2007

(54) METHODS OF USING SETTABLE COMPOSITIONS IN A SUBTERRANEAN FORMATION

(75) Inventors: Stephen W. Almond, Spring, TX (US); Ryan M. Foster, Houston, TX (US)

(73) Assignee: Halliburton Energy Services, Inc.

( * ) Notice: Subject to any disclaimer, the term of this patent is extended or adjusted under 35 U.S.C. 154(b) by 421 days.

(21) Appl. No.: 10/837,804

(22) Filed: May 3, 2004

(65) Prior Publication Data
US 2005/0241828 A1   Nov. 3, 2005

(51) Int. Cl.
*E21B 33/138* (2006.01)
*E21B 21/00* (2006.01)

(52) U.S. Cl. ............. 166/294; 166/292; 166/300; 175/72; 106/685; 106/686; 507/140; 507/145

(58) Field of Classification Search ........ 166/292, 166/293, 294, 300, 307; 175/72; 106/684, 106/685, 686, 900; 405/263, 266; 507/140, 507/145, 269, 277
See application file for complete search history.

(56) References Cited

U.S. PATENT DOCUMENTS

| | | | |
|---|---|---|---|
| 1,019,083 A | 3/1912 | Pink et al. | |
| 1,634,505 A | 7/1927 | McCaughey | |
| 2,351,641 A | 6/1944 | Sohl et al. | 106/106 |
| 2,393,174 A * | 1/1946 | Larsen | 507/141 |
| 2,543,959 A | 3/1951 | Eastin et al. | 106/106 |
| 2,939,799 A | 6/1960 | Chisholm | 106/108 |
| 3,219,604 A * | 11/1965 | Fischer | 525/8 |
| 3,238,155 A | 3/1966 | Harrell et al. | 260/2.5 |
| 3,320,077 A | 5/1967 | Prior | 106/105 |
| 3,483,006 A * | 12/1969 | Bostroem et al. | 106/619 |
| 3,495,997 A | 2/1970 | Sherry | 106/106 |
| 3,816,148 A | 6/1974 | Barthel | |
| 3,887,009 A * | 6/1975 | Miller et al. | 166/292 |
| 3,951,885 A | 4/1976 | Thompson | 260/2.5 AK |
| 3,963,849 A | 6/1976 | Thompson | 428/182 |
| 4,042,032 A | 8/1977 | Anderson et al. | 166/276 |
| 4,158,570 A | 6/1979 | Irwin | 106/106 |
| 4,209,339 A | 6/1980 | Smith-Johannsen | 106/106 |
| 4,352,694 A | 10/1982 | Smith-Johannsen | 106/106 |
| 4,480,693 A | 11/1984 | Newlove et al. | 166/293 |
| 4,886,550 A | 12/1989 | Alexander | 106/74 |
| 5,004,505 A | 4/1991 | Alley et al. | 106/685 |
| 5,039,454 A | 8/1991 | Policastro et al. | 252/610 |
| 5,110,361 A * | 5/1992 | Alley et al. | 106/685 |
| 5,213,161 A | 5/1993 | King et al. | 166/293 |
| 5,220,960 A | 6/1993 | Totten et al. | 166/293 |
| 5,228,524 A | 7/1993 | Johnson et al. | 175/72 |
| 5,281,270 A * | 1/1994 | Totten et al. | 106/687 |
| 5,298,069 A | 3/1994 | King et al. | 106/686 |
| 5,363,916 A | 11/1994 | Himes et al. | 166/276 |
| 5,368,102 A | 11/1994 | Dewprashad et al. | 166/276 |
| 5,381,864 A | 1/1995 | Nguyen et al. | 166/280 |
| 5,439,057 A | 8/1995 | Weaver et al. | 166/295 |
| 5,492,178 A | 2/1996 | Nguyen et al. | 166/276 |
| 5,504,062 A | 4/1996 | Johnson et al. | 507/212 |
| 5,529,123 A | 6/1996 | Carpenter et al. | 166/293 |
| 5,616,541 A * | 4/1997 | Dobson et al. | 507/145 |
| 5,641,728 A * | 6/1997 | Dobson et al. | 507/111 |
| 5,680,900 A | 10/1997 | Nguyen et al. | 166/295 |
| 5,783,526 A * | 7/1998 | Dobson et al. | 507/261 |
| 5,996,694 A | 12/1999 | Dewprashad et al. | 166/294 |
| 6,200,381 B1 | 3/2001 | Rechichi | 106/801 |
| 6,390,195 B1 | 5/2002 | Nguyen et al. | 166/276 |
| 6,405,801 B1 | 6/2002 | Vijn et al. | 166/293 |
| 6,422,314 B1 | 7/2002 | Todd et al. | 166/312 |
| 6,494,263 B2 | 12/2002 | Todd et al. | 166/312 |
| 6,592,660 B2 | 7/2003 | Nguyen et al. | 106/677 |
| 6,626,992 B2 | 9/2003 | Vijn et al. | 106/726 |
| 6,664,215 B1 | 12/2003 | Tomlinson | 507/269 |

FOREIGN PATENT DOCUMENTS

| | | |
|---|---|---|
| EP | 0 558 232 A1 | 9/1993 |
| EP | 0 582 367 A1 | 2/1994 |
| WO | WO 92/17414 | 10/1992 |
| WO | WO 01/93842 A2 | 12/2001 |

OTHER PUBLICATIONS

Foreign communication from a related counterpart application dated Sep. 9, 2005.
Paper Entitled "Acid-Soluble Magnesia Cement: New Applications in Completion and Workover Operations", By Ronald E. Sweatman et al.

* cited by examiner

*Primary Examiner*—George Suchfield
(74) *Attorney, Agent, or Firm*—Craig W. Roddy; Baker Botts, LLC.

(57) ABSTRACT

The present invention relates to settable compositions that comprise magnesium oxide and at least one divalent salt and associated methods of use. In some embodiments, the present invention discloses methods of a forming a hardened mass comprising providing a settable composition comprising magnesium oxide, and a brine comprising water and a divalent salt; placing the settable composition into a desired location; and allowing the settable composition to set to form the hardened mass. In other embodiments, the present invention discloses methods of forming a hardened mass in a subterranean formation comprising placing a brine comprising water and a divalent salt into the subterranean formation; contacting the brine with magnesium oxide; and allowing the brine and the magnesium oxide to react to form the hardened mass. In other embodiments, the present invention discloses methods forming a casing in a well bore, and converting a drilling fluid to a settable composition.

23 Claims, No Drawings

METHODS OF USING SETTABLE COMPOSITIONS IN A SUBTERRANEAN FORMATION

BACKGROUND OF THE INVENTION

The present invention relates to settable compositions. More particularly, the present invention relates to settable compositions that comprise magnesium oxide and at least one divalent salt and associated methods of use.

Settable compositions are commonly used in subterranean operations. As used herein, a settable composition refers to a composition that is capable of setting so as to form a hardened mass. Settable compositions may be used in the drilling and completion of well bores to stabilize unconsolidated portions of a subterranean formation, e.g., those comprising clays, shales, sandstones, and the like. Unconsolidated portions of formations include those that contain loose particulates and those wherein the bonded particulates have insufficient bond strength to withstand the forces produced by the production of fluids. Another example of where settable compositions may be used is to seal portions of a formation, such as to prevent the loss of fluid circulation or to prevent the undesirable migration of formation fluids and/or treatment fluids. Settable compositions may also be used in primary cementing operations, inter alia, to support and position a casing string in a well bore, and in reverse and remedial cementing operations. Another use of settable compositions may be to form a "chemical casing" in a well bore, e.g., to stabilize the formation.

Conventional settable compositions may comprise a wide variety of cementitious materials such as hydraulic cement (e.g., Portland cement), fly ash, slag, resins, and the like. Another conventional settable composition may be formed by the mixture of magnesium oxide with aqueous magnesium chloride to form magnesium oxychloride cement, which is commonly known as "Sorel cement." A similar settable composition may be formed by the mixture of magnesium oxide with aqueous magnesium sulfate. Settable compositions comprising a cementitious material, such as those described above, may be placed into a desired location within a subterranean formation and allowed to set to form a hardened mass. Generally, these settable compositions may be placed into the desired location as one fluid system, which can be problematic. For example, problems may occur when the settable composition begins to harden before it has reached its desired location within the subterranean formation. Additionally, use of these conventional settable compositions may be problematic due to placement difficulty, cost, reactivity, local availability, and compatibility with both formation and drilling fluids.

SUMMARY OF THE INVENTION

The present invention relates to settable compositions. More particularly, the present invention relates to settable compositions that comprise magnesium oxide and at least one divalent salt and associated methods of use.

In some embodiments, the present invention provides a method of forming a hardened mass that comprises the steps of providing a settable composition that comprises magnesium oxide, and a brine that comprises water and a divalent salt, wherein the divalent salt does not contain magnesium cations; placing the settable composition into a desired location; and allowing the settable composition to set to form the hardened mass.

In other embodiments, the present invention provides a method of forming a hardened mass in a subterranean formation that comprises the steps of placing a brine that comprises water and a divalent salt into the subterranean formation; contacting the brine with magnesium oxide; and allowing the brine and the magnesium oxide to react to form the hardened mass.

In other embodiments, the present invention provides a method of sealing a void in a subterranean formation that comprises the steps of placing a brine that comprises water and a divalent salt into the void in the subterranean formation; contacting the brine with magnesium oxide; and allowing the brine and the divalent salt to react to form a hardened mass.

In other embodiments, the present invention provides a method of stabilizing an unconsolidated portion of a subterranean formation that comprises the steps of placing a brine that comprises water and a divalent salt into the unconsolidated portion of the subterranean formation; contacting the brine with magnesium oxide; and allowing the brine and the magnesium oxide to react to form a hardened mass that consolidates the unconsolidated portion of the subterranean formation.

In yet other embodiments, the present invention provides a method of forming a casing in a well bore penetrating a subterranean formation that comprises the steps of placing magnesium oxide on a surface within a subterranean formation; contacting the magnesium oxide with a brine that comprises a divalent salt; allowing the magnesium oxide and brine to react to form a hardened mass that at least partially acts as a casing for at least a portion of the well bore.

In other embodiments, the present invention provides a method of converting a drilling fluid to a settable composition that comprises the steps of providing a drilling fluid that comprises a divalent salt; and adding magnesium oxide to the drilling fluid to form a settable composition.

In other embodiments, the present invention provides a method of converting a drilling fluid to a settable composition that comprises the steps of providing a drilling fluid that comprises magnesium oxide; and adding a divalent salt to the drilling fluid to form a settable composition.

The features and advantages of the present invention will be readily apparent to those skilled in the art upon a reading of the description of the exemplary embodiments that follows.

DESCRIPTION OF EXEMPLARY EMBODIMENTS

The present invention relates to settable compositions. More particularly, the present invention relates to settable compositions that comprise magnesium oxide and at least one divalent salt and associated methods of use. The methods and composition of the present invention are suitable for use in both offshore operations and onshore operations. While the method and compositions of the present invention may be useful in a wide variety of operations where it is desired to form a hardened mass, they may be particularly useful in subterranean operations.

The settable compositions of the present invention generally comprise a brine that comprises water and at least one divalent salt, and magnesium oxide. Other additives suitable for use in subterranean operations may be added to the settable compositions as desired.

The brines used in the present invention generally comprise water and at least one divalent salt, wherein the divalent salt comprises a divalent cation and an anion.

Generally, the water may be from any source provided that it does not contain compounds that may adversely affect the other components in the settable composition. A wide variety of divalent cations are suitable, including, but not limited to, $Ca^{2+}$, $Sr^{2+}$, $Zn^{2+}$, $Mg^{2+}$, and the like. In some embodiments, the divalent salt may not contain magnesium cations. A wide variety of anions are suitable, including, but not limited to chloride, bromide, phosphate, sulfate, and the like. Examples of suitable divalent salts include, but are not limited to, calcium chloride, magnesium chloride, zinc chloride, calcium phosphate, magnesium phosphate, magnesium sulfate, calcium bromide, zinc bromide, and mixtures thereof. One of ordinary skill in the art will recognize the suitability of certain divalent salts where use of subterranean treatment fluids may be subject to environmental restrictions, and may make appropriate adjustments to the compositions of the present invention as needed. In some embodiments, it may be desired to have a heavier composition, wherein a divalent salt that comprises a heavier cation, such as zinc, may be used in the settable composition.

At least one divalent salt should be present in the settable compositions of the present invention. A single salt or a combination of salts should be present in a settable composition of the present invention in an amount sufficient, inter alia, to provide the desired compressive strength and set time for the settable composition. In certain embodiments, the divalent salt may be present in the settable composition in an amount in the range of from about 15% to about 60% by weight of the settable composition.

The magnesium oxide present in the settable compositions of the present invention should have an activity level sufficient to provide the desired reactivity. For example, the higher the activity level of the magnesium oxide, the faster the reaction of the magnesium oxide with the other components of the settable composition that may result in the formation of a hardened mass. The activity level of the magnesium oxide may vary based on a number of factors. For example, the particle size differential of the magnesium oxide particles may affect the activity level. A smaller particle size differential may result in a higher activity level due, inter alia, to a greater surface area. Another factor that may affect the activity level of the magnesium oxide is a sintering process. By varying the heat applied during, and time of, the sintering process, magnesium oxide with varying activity levels may be provided. Magnesium oxide that has not been treated by a sintering process may have a very high activity level, and thus it may be highly reactive in the settable compositions of the present invention. Deadburned magnesium oxide is magnesium oxide that has been sintered such that there may be a very low activity level. Thus, it may be less reactive in the settable compositions of the present invention. In some embodiments of the present invention, a relatively more reactive magnesium oxide may be desired, such as where it may be desired to have a settable composition with a relatively short set time, e.g., when desired to rapidly seal off a loss circulation zone. As referred to herein, a "lost circulation zone" refers to the portions of a subterranean formation into which subterranean treatment fluids may be lost. In other embodiments of the present invention, a relatively less reactive magnesium oxide may be desired, for example, where a delay may be desired between mixing the settable composition and the formation of a hardened mass.

The magnesium oxide should be present in the settable composition in an amount sufficient, inter alia, to provide the desired compressive strength and set time for the settable composition. In certain embodiments, the magnesium oxide may be present in the settable composition in an amount in the range of from about 30% to about 70% by weight of the settable composition.

The settable compositions described above set with time to form a hardened mass. Optionally, additives such as set retarders may be added to the settable compositions, e.g., to control the setting and placement time of the settable compositions. Examples of suitable set retarders include, but are not limited to, phosphate derivatives (e.g., sodium hexametaphosphate) and sugars.

Polymeric materials also may be added to the settable compositions of the present invention. Among other things, the inclusion of polymeric materials in the settable compositions may affect the resiliency of the resultant hardened mass. Examples of suitable polymeric materials include water-soluble polymers, such as polysaccharides (e.g., starches and xanthan) and polyacrylamides.

Additional additives may be added to the settable compositions of the present invention as deemed appropriate by one skilled in the art with the benefit of this disclosure. Examples of such additives include fly ash, Pozzalonic additives, fluid loss control additives, surfactants, dispersants, micas, fibers, formation conditioning agents, bentonite, expanding additives, microspheres, weighting materials, defoamers, and the like.

In some embodiments of the present invention, a method of forming a hardened mass may be provided that comprises providing a settable composition that comprises magnesium oxide, and a brine that comprises water and a divalent salt, wherein the divalent salt does not contain magnesium cations; placing the settable composition into a desired location; and allowing the settable composition to set to form the hardened mass. In some embodiments, the desired location may be within a subterranean formation.

In yet other embodiments of the present invention, a method of forming a hardened mass in a subterranean formation may be provided that comprises placing a brine that comprises water and at least one divalent salt into the subterranean formation; contacting the brine with magnesium oxide; and allowing the brine and the magnesium oxide to react to form the hardened mass. Generally, the magnesium oxide may be placed into a subterranean formation prior to, simultaneously with, or after the brine that comprises at least one divalent salt may be placed into the subterranean formation. In some embodiments, the magnesium oxide may be placed into the subterranean formation as part of a treatment fluid. While these methods for forming a hardened mass may be useful in a wide variety of subterranean operations, they may be particularly useful where it may be desired to quickly form a hardened mass, e.g., to rapidly seal off a loss circulation zone. For example, the brine that comprises water and at least one divalent salt may be placed into the subterranean formation as part of an ongoing subterranean operation, such as a drilling operation. When desired to form a hardened mass (e.g., to seal of a loss circulation zone), the treatment fluid that comprises magnesium oxide may be placed into the subterranean formation where it contacts the brine, thereby reacting with the brine to form a hardened mass. The magnesium oxide and the brine that comprises water and at least one divalent salt may be the same as those described above as components of the settable compositions of the present invention.

One of ordinary skill in the art with the benefit of this disclosure will appreciate that the brine that comprises water and at least one divalent salt may be prepared specifically for use in the methods of the present invention. In some embodiments, the brine that comprises water and at least one divalent salt may be any brine that comprises water and at least one divalent salt used in subterranean treatment fluids, such as drilling fluids or spacer fluids. Generally, the brines of the present invention should have a sufficient concentration of the divalent salt, inter alia, to provide the desired compressive strength and set time for the hardened mass. In certain embodiments, the concentration of the divalent salt in the brine may be in the range of from about 4% by weight of the brine to about saturation. One of ordinary skill in the art will be aware that a higher concentration of divalent salt in the brine may be used in the embodiments where the magnesium oxide is placed into the subterranean prior to the brine.

One of ordinary skill in the art with the benefit of this disclosure will appreciate that the treatment fluid that comprises magnesium oxide may be prepared specifically for use in the methods of the present invention. In some embodiments, the treatment fluid may be any of a wide variety of treatment fluids, such as drilling fluids or spacer fluids. The magnesium oxide should be present in the treatment fluid in an amount sufficient, inter alia, to provide the desired compressive strength and set time for the hardened mass. In certain embodiments, the magnesium oxide may be present in the treatment fluid in an amount in the range of from about 30% to about 70% by weight of the treatment fluid.

Sufficient amounts of the divalent salt and magnesium oxide should be placed into the subterranean formation, inter alia, to provide the desired compressive strength and set time for the hardened mass. Generally, in order to form the desired hardened mass, the weight ratio of the magnesium oxide to the divalent salt may be in the range of from about 1:5 to about 5:1. In certain preferred embodiments of the present invention, the weight ratio of the magnesium oxide to the divalent salt may be in the range of from about 1:2 to about 2:1.

The methods of forming a hardened mass of the present invention may be useful in a variety of operations where it may be desirable to form a hardened mass. The following is a nonlimiting list of exemplary embodiments where the hardened mass formed by the settable compositions of the present invention may be useful. In certain embodiments, the settable compositions and methods of the present invention may be used in conventional primary cementing operations to form a hardened mass that may support the casing string within the well bore and/or provide zonal isolation by preventing the undesirable flow of formation fluids or treatment fluids. In other embodiments, the settable compositions and methods of the present invention may be used in remedial and reverse cementing operations. In other embodiments, the settable compositions and methods of the present invention may be used to form a hardened mass that seals a void in a subterranean formation. In other embodiments, the settable compositions and methods of the present invention may be used to combat the loss of fluid circulation by forming a hardened mass that seals off loss circulation zones within the subterranean formation. In other embodiments, the settable compositions and methods of the present invention may be used to provide conformance control in a desired portion of the subterranean formation, e.g., by forming a hardened mass that seals off water- or gas-producing zones within the formation. In yet other embodiments, the settable compositions and methods of the present invention may be used to form hardened masses that stabilize unconsolidated or loosely consolidated portions of the subterranean formation. In other embodiments, the settable compositions and methods of the present invention may be used to form a casing in a well bore. For example, the resultant hardened mass may set in a portion of a well bore so as to act as a casing for the well bore.

In certain embodiments, it may be desirable to dissolve at least portion of the hardened mass formed by the methods of the present invention by contact with an acid. This may be useful, among other things, to remove the hardened mass if it has formed in an undesirable location within the subterranean formation or after the need for the hardened mass has disappeared. A variety of acids may be suitable to remove the hardened mass, including, but not limited to, hydrochloric acid, acetic acid, and formic acid. One of ordinary skill in the art with the benefit of this disclosure will know when to contact the hardened mass with an acid for a particular application.

In other embodiments of the present invention, a method of forming a casing in a well bore penetrating a subterranean formation is provided that comprises placing magnesium oxide on a surface within a subterranean formation; contacting the magnesium oxide with a brine that comprises water and at least one divalent salt; and allowing the magnesium oxide and the brine to react to form a hardened mass that at least partially acts as a casing for at least a portion of the well bore. In certain embodiments, the magnesium oxide may be placed onto the surface within the subterranean formation by contacting the surface within the subterranean formation with a treatment fluid that comprises magnesium oxide, wherein the magnesium oxide present within the treatment fluid adheres to the surface, e.g., as bridging particles. The magnesium oxide and the brine that comprises water and at least one divalent salt may be the same as those described above as components of the settable compositions of the present invention.

One of ordinary skill in the art with the benefit of this disclosure will appreciate that the brine that comprises at least one divalent salt may be prepared specifically for use in the methods of the present invention. In some embodiments, the brine that comprises at least one divalent salt may be any brine that comprises at least one divalent salt used in subterranean operations, such as drilling fluids or spacer fluids. Generally, the brines of the present invention should have a sufficient concentration of the divalent salt, inter alia, to provide the desired compressive strength and set time for the hardened mass. In certain embodiments, the concentration of the divalent salt in the brine may be in the range of from about 4% by weight of the brine to about saturation. One of ordinary skill in the art should be aware that a higher concentration of the divalent salt in the brine, such as a saturated brine, may be used where it is desired to quickly seal off a portion of a subterranean formation.

One of ordinary skill in the art with the benefit of this disclosure will appreciate that the treatment fluid that comprises the magnesium oxide may be prepared specifically for use in the methods of the present invention. In some embodiments, the treatment fluid may be any of a wide variety of treatment fluids, such as drilling fluids or spacer fluids. The magnesium oxide should be present in the treatment fluid in an amount sufficient, inter alia, to provide the desired compressive strength and set time for the hardened mass. In certain embodiments, the magnesium oxide may be present in the treatment fluid in an amount in the range of from about 5% to about 70% by weight of the treatment fluid.

Sufficient amounts of the divalent salt and magnesium oxide should be placed into the subterranean formation, inter alia, to provide the desired compressive strength and set time for the hardened mass. Generally, in order to form the desired hardened mass, the weight ratio of the magnesium oxide to the divalent salt may be in the range of from about 1:5 to about 5:1. In certain preferred embodiments of the present invention, the weight ratio of the magnesium oxide to the divalent salt may be in the range of from about 1:2 to about 2:1.

In other embodiments of the present invention, a method of converting a drilling fluid to a settable composition may be provided that comprises providing a drilling fluid that comprises a divalent salt; and adding magnesium oxide to the drilling fluid to form a settable composition. The settable composition formed from the drilling fluid may be placed into a desired location within a subterranean formation and allowed to set to form a hardened mass in a desired location. When adding the magnesium oxide to the drilling fluid, one should monitor the drilling fluid to ensure that the drilling fluid does not flash set. Additional additives such as set retarders may further be added to the drilling fluid, inter alia, to control the set time and placement time of the settable composition formed from the drilling fluid if desired.

The divalent salt may be present in the drilling fluid in an amount sufficient, inter alia, to provide the desired compressive strength and set time for the settable composition. In certain embodiments, the divalent salt may be present in the drilling fluid in an amount in the range of from 15% to about 60% by weight of the drilling fluid.

The magnesium oxide may added to the drilling fluid in an amount sufficient, inter alia, to provide the desired compressive strength and setting time of the settable composition. In certain embodiments, the magnesium oxide may be added to the drilling fluid in an amount in the range of from 30% to about 70% by weight of the drilling fluid.

In other embodiments of the present invention, a method of converting a drilling fluid to a settable composition may be provided that comprises providing a drilling fluid that comprises magnesium oxide; and adding a divalent salt to the drilling fluid to form a settable composition. The settable composition may be placed into a subterranean formation and allowed to set to form a hardened mass in a desired location. When adding the divalent salt to the drilling fluid, one should monitor the drilling fluid properties to ensure that the drilling fluid does not flash set. Additional additives such as set retarders may be added to the drilling fluid, inter alia, to control the set time and placement time of the settable composition.

The divalent salt may be added to the drilling fluid in an amount sufficient, inter alia, to provide the desired compressive strength and set time for the settable composition. In certain embodiments, the divalent salt may be added to the drilling fluid in an amount in the range of from 15% to about 60% by weight of the drilling fluid.

The magnesium oxide may be present in the drilling fluid in an amount sufficient, inter alia, to provide the desired compressive strength and set time for the settable composition. In certain embodiments, the magnesium oxide may be present in the drilling fluid in an amount in the range of from 30% to about 70% by weight of the drilling fluid.

To facilitate a better understanding of the present invention, the following examples of preferred embodiments are given. In no way should the following examples be read to limit, or to define, the scope of the invention.

EXAMPLE

This example was performed using the following procedure. A sample composition was prepared and placed into a 1 pint rolling jar. Next, the rolling jar was placed in an oven and hot rolled at 150° F. for 16 hours. When the 16-hour hot roll was complete, the sample was cooled to room temperature. Upon cooling, the contents of the rolling jar were observed.

Sample Composition No. 1 comprised 196 milliliters of water, 140 grams of calcium chloride, and 370 grams of magnesium oxide. Sample Composition No. 1 expanded to completely fill the rolling jar. Furthermore, the composition set to form a hardened mass that was substantially impenetrable.

Sample Composition No. 2 comprised 196 milliliters of water, 140 grams of calcium chloride, 370 grams of magnesium oxide, and 7.6 grams of polymeric materials. Sample Composition No. 2 expanded to completely fill the rolling jar. Furthermore, the composition set to form a hardened mass that was at least partially penetrable.

Sample Composition No. 3 comprised 304 milliliters of water, 107 grams of calcium chloride, 40 grams of magnesium oxide, and 8.25 grams of polymeric materials. Sample Composition No. 3 did not set to form a hardened mass.

Thus, Example 1 demonstrates, inter alia, that Sample Composition No. 1 and Sample Composition No. 2, settable compositions of the present invention comprising magnesium oxide and a divalent salt, set to form a hardened mass.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of forming a hardened mass comprising:
   providing a settable composition that comprises
      magnesium oxide, and
      a brine that comprises water and a divalent salt, wherein the divalent salt does not contain magnesium cations;
   placing the settable composition in a subterranean formation; and
   allowing the settable composition to set to form the hardened mass.

2. The method of claim 1 wherein the magnesium oxide is present in the settable composition in an amount in the range of from about 30% to about 70% by weight of the settable composition.

3. The method of claim 1 wherein the divalent salt is present in the settable composition in an amount in the range of from about 15% to about 60% by weight of the settable composition.

4. The method of claim 1 wherein the settable composition further comprises a polymeric material.

5. The method of claim 1 wherein the settable composition further comprises a set retarder.

6. The method of claim 5 wherein the set retarder comprises a component selected from the group consisting of: a phosphate derivative and a sugar.

7. The method of claim 1 wherein the hardened mass seals a water-producing zone in the subterranean formation.

8. The method of claim 1 wherein the hardened mass seals a loss circulation zone in the subterranean formation.

9. The method of claim 1 wherein the hardened mass stabilizes an unconsolidated portion of the subterranean formation.

10. A method of forming a hardened mass in a subterranean formation comprising:
    placing a brine that comprises water and a divalent salt into the subterranean formation;

contacting the brine with magnesium oxide; and allowing the brine and the magnesium oxide to react to form the hardened mass.

11. The method of claim 10 wherein the magnesium oxide is placed into the subterranean formation prior to the step of placing the brine into the subterranean formation.

12. The method of claim 10 wherein the magnesium oxide is placed into the subterranean formation as part of a treatment fluid.

13. The method of claim 10 wherein the magnesium oxide is present in the treatment fluid in an amount in the range of from about 30% to about 70% by weight of the settable treatment fluid.

14. The method of claim 10 wherein the hardened mass seals at least a portion of the subterranean formation.

15. The method of claim 10 wherein the hardened mass stabilizes an unconsolidated portion of the subterranean formation.

16. The method of claim 10 further comprising contacting at least a portion of the hardened mass with an acid to remove the portion of the hardened mass.

17. The method of claim 10 wherein the divalent salt is selected from the group consisting of: calcium chloride, magnesium chloride, zinc chloride, calcium phosphate, magnesium phosphate, magnesium sulfate, zinc bromide, calcium bromide and a mixture thereof.

18. The method of claim 10 wherein the concentration of the divalent salt in the brine is in the range of from about 4% by weight of the brine to about saturation.

19. The method of claim 10 wherein the weight ratio of the magnesium oxide to the divalent salt is in the range of from about 1:5 to about 5:1.

20. The method of claim 10 wherein the weight ratio of the magnesium oxide to the divalent salt is in the range of from about 1:2 to about 2:1.

21. A method of stabilizing an unconsolidated portion of a subterranean formation comprising the steps of:

placing a brine that comprises water and a divalent salt into the unconsolidated portion of the subterranean formation;

contacting the brine with magnesium oxide; and allowing the brine and the magnesium oxide to react to form a hardened mass that consolidates the unconsolidated portion of the subterranean formation.

22. The method of claim 21 wherein the magnesium oxide is placed into the unconsolidated portion prior to the step of placing the brine into the unconsolidated portion.

23. The method of claim 21 wherein the magnesium oxide is placed into the unconsolidated portion as part of a treatment fluid.

* * * * *